(12) United States Patent
Walker, Jr. et al.

(10) Patent No.: US 6,895,156 B2
(45) Date of Patent: May 17, 2005

(54) SMALL DIAMETER, HIGH STRENGTH OPTICAL FIBER

(75) Inventors: Christopher Bland Walker, Jr., St. Paul, MN (US); James W. Laumer, White Bear Lake, MN (US); Jesper Karl Marklund, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 179 days.

(21) Appl. No.: 09/973,635

(22) Filed: Oct. 9, 2001

(65) Prior Publication Data

US 2003/0099451 A1 May 29, 2003

(51) Int. Cl.$^7$ .............................................. G02B 6/22
(52) U.S. Cl. ................................................... 385/128
(58) Field of Search .......................... 385/80–89, 141, 385/147, 43–46, 123–128, 142, 109; 264/1.28, 1.29, 171.16, 209.1

(56) References Cited

U.S. PATENT DOCUMENTS

| | | | | |
|---|---|---|---|---|
| 4,172,106 A | * | 10/1979 | Lewis | 350/96.23 |
| 4,387,222 A | | 6/1983 | Koshar | 544/4 |
| 4,505,997 A | | 3/1985 | Armand et al. | 429/192 |
| 4,655,545 A | | 4/1987 | Yamanishi et al. | 350/96.34 |
| 5,021,308 A | | 6/1991 | Armand et al. | 429/194 |
| 5,072,040 A | | 12/1991 | Armand | 564/82 |
| 5,162,177 A | | 11/1992 | Armand et al. | 429/194 |
| 5,181,269 A | | 1/1993 | Petisce | 385/128 |
| 5,273,840 A | | 12/1993 | Dominey | 429/192 |
| 5,340,898 A | | 8/1994 | Cavezzan et al. | 528/19 |
| 5,381,504 A | | 1/1995 | Novack et al. | 385/128 |
| 5,468,902 A | | 11/1995 | Castellanos et al. | 568/6 |
| 5,550,265 A | | 8/1996 | Castellanos et al. | 556/7 |
| 5,554,664 A | | 9/1996 | Lamanna et al. | 522/25 |
| 5,644,670 A | | 7/1997 | Fukuda et al. | 385/124 |
| 5,668,192 A | | 9/1997 | Castellanos et al. | 552/31 |
| 5,807,905 A | | 9/1998 | Cunningham et al. | 522/25 |
| RE36,146 E | | 3/1999 | Novack et al. | 385/128 |
| 5,889,908 A | * | 3/1999 | Miller | 385/46 |
| 6,011,180 A | | 1/2000 | Cunningham et al. | 568/6 |
| 6,282,349 B1 | * | 8/2001 | Griffin | 385/81 |

FOREIGN PATENT DOCUMENTS

| | | |
|---|---|---|
| EP | 0 447 926 | 9/1991 |
| EP | 0 775 706 A2 | 5/1997 |
| EP | 0 834 492 A2 | 4/1998 |
| EP | 0 953 857 A1 | 11/1999 |
| GB | 2357759 | 7/2001 |
| WO | WO 98/52952 | 11/1998 |
| WO | WO 98/59268 | 12/1998 |

OTHER PUBLICATIONS

Lutz Turowsky and Konrad Seppelt, Tris((trifluromethyl) sulfonyl)methane, $HC(SO_2CF_3)_3$; Inorg. Chem. 1988, 27, 2135–2137.

\* cited by examiner

*Primary Examiner*—J. F. Duverne
(74) *Attorney, Agent, or Firm*—Gregg H. Rosenblatt

(57) ABSTRACT

A coated optical fiber, preferably a GGP optical fiber includes an optical fiber core, and a silica cladding over the optical fiber core, to provide a silica clad core. A permanent polymeric coating forms on the silica cladding during ultraviolet radiation of a photocurable composition containing a non-hydrolyzable photoinitiator. The coated optical fiber has a diameter from about 120 microns to about 160 microns and a relative frequency distribution of at least about 85% for dynamic fatigue measurements between about $49.2 \times 10^3$ kg/cm$^2$ (700 kpsi) and about $63.3 \times 10^3$ kg/cm$^2$ (900 kpsi).

21 Claims, 1 Drawing Sheet

SMALL DIAMETER, HIGH STRENGTH OPTICAL FIBER

FIELD OF THE INVENTION

The invention relates generally to silica optical fibers, and more specifically to thin, permanently coated optical fibers having a small average diameter yet possessing strength comparable to conventional optical fibers.

BACKGROUND OF THE INVENTION

Modern communications networks have been constructed to supply and share almost incomprehensible amounts of information. Regardless of the current capabilities of communications systems, there is a demand for more information and communication services. This demand could be satisfied using additional signal carriers, i.e. optical fibers. Each additional carrier adds to the space required for forming connections between optical fibers and related optoelectronic devices. This is contrary to the prevailing trend for succeeding generations of signal carriers to occupy less space than current systems.

The manufacturing process for optical fibers requires the fabrication of a pre-form, including a wave-guide of higher refractive index surrounded by a silica cladding of lower refractive index. Heating the perform in a furnace raises its temperature to cause melting and subsequent drawing down of an optical fiber from the molten pre-form. Generally the glass fiber includes one or more polymer coatings, also known as buffer coatings, applied in-line to the outside diameter, or cladding, of the optical fiber. A coated optical fiber, known also as a GGP fiber, includes a permanent polymer (P-coat) applied over the silica cladding before application of additional buffer coats as discussed previously.

U.S. Pat. No. 5,381,504 and U.S. Pat. No. Re. 36,146 describe commonly used, commercially available GGP fibers (Glass, Glass, Polymer) that include a doped silica core, a silica cladding, and a permanent polymeric coating or P-coat encircling the cladding. The dimensions of the layers of material comprising a commercially available GGP fiber produce an accumulated fiber diameter of approximately 250 microns to which a silica core and a reduced silica cladding contribute 100 microns. Addition of a P-coat increases the diameter to about 125 microns. After application of two standard buffer coats (the first to provide microbend protection, the second to provide abrasion resistance), the coated optical fiber reaches the final diameter of approximately 250 microns. Other types of fiber, referred to as standard fibers, do not include a permanent polymer layer, i.e. they are non-GGP fibers. Common non-GGP fibers include a silica core and cladding for a combined diameter of 125 microns and two standard buffer coats to give a final, coated optical fiber diameter of approximately 250 microns. The inner or primary buffer typically has a lower Shore D hardness than the outer or secondary buffer.

U.S. Pat. No. 5,644,670 describes the formation of a bare optical fiber including an optical fiber core, cladding and polymer covering. Repeated statements indicate that the bare optical fiber preferably has a diameter less than 128 microns and the polymer covering has a Shore hardness of D55 or more. Constraints on the diameter of a bare fiber relate to the need to mate with optical fiber connectors that typically have cross sectional dimensions of 125 microns. The use of a polymer coating with a high Shore hardness prevents damage to the cladding of a bare optical fiber by crimp connectors. Attachment of a crimp connector, to the terminal portion of a bare optical fiber, first requires removal of protective primary and secondary coatings from a jacketed broad bandwidth optical fiber cable that uses the bare optical fiber as the wave-guide element. A similar protected 125 micron wave-guide element is described in European Patent Application EP0953857 A1. In this case an optical fiber ribbon comprises a plurality of optical fibers arranged in a row. Each optical fiber comprises a core, a cladding and a non-strippable thin coating made of a synthetic resin, from 2 microns to 15 microns thick, coated around the cladding. The non-strippable thin coating provides protection to the underlying cladding and glass core during fiber connection to an optical fiber connector or planar lightwave circuit (PLC). An optical fiber ribbon includes a primary coating having a thickness up to twice the diameter of an optical fiber and a secondary coating that may be from 20 microns to 100 microns thick. U.S. Pat. No. 5,644,670 and EP0953857 A1 both address the effect of thickness of a polymer covering or non-strippable coating on the incidence of damage to the cladding layer while clamping a crimp connector on the end of an optical fiber from which primary and secondary coatings have been removed. There is no information related to the overall mechanical strength of bare optical fibers.

In many optoelectronic devices and optical fiber containment structures, there is limited space to accommodate large diameter fibers that include primary and secondary coated layers, as described above. This has produced a desire for finer optical fibers, preferably capable of withstanding bending around small radii for a range of communications applications. Communication applications, as indicated, represent optical fiber networks that need interconnection using standard optical fiber connectors. A standard connector typically includes a 125 micron ferrule, into which an optical fiber is inserted to be securely held in alignment either with another optical fiber or a related optoelectronic device. Standard coated optical fibers typically have a diameter of about 250 microns, as discussed previously. Inter-fiber connections can only be made with these fibers after removing coating to provide a stripped fiber having a diameter small enough for insertion into a standard ferrule. Fiber damage commonly occurs during the stripping process to remove buffer coating from an optical fiber. Such damage could be avoided through use of a strong optical fiber that did not require stripping of buffer coats to fit snugly in standard 125 micron ferruled connectors. A further advantage would be for the fiber to show no sign of wear or degradation by abrasion or chemical attack.

The P-coat in a GGP fiber typically comprises an epoxy resin that may be cationically curable, preferably by exposure to a suitable form of actinic radiation. Other known cationically curable resins include cycloaliphatic epoxy groups or vinyl ethers in their structure. Manufacture of a GGP coated optical fiber requires solidifying of the silica clad fiber as it is drawn from the furnace followed immediately by application of the P-coat. A P-coat typically contains an iodonium salt as a cationic photoinitiator that interacts with suitable radiation to cure the polymer. One or more protective buffer coats, applied over the cured P-coat, provide protection and abrasion resistance while raising the overall diameter of the GGP fiber construction to approximately 250 microns.

The following discussion refers to other cationic photoinitiators, most of which have been used in applications unrelated to coated optical fiber production. U.S. Pat. Nos. 5,340,898, 5,468,902, 5,550,265 and 5,668,192 discuss various iodonium borates and organometallic borates as photoinitiators. These patents, however, do not mention borate anion containing photoinitiators as curatives for polymeric materials applied to optical fibers. U.S. Pat. No. 6,011,180 discloses organoboron photoinitiators suitable for photopolymerization of monomer compositions having acid group functionality. The photoinitiators are described by the generic formula $G^+ (R)_4 B^-$ wherein $G^+$ includes onium cations, particularly sulfonium cations or iodonium cations and $(R)_4$ represents substituted alkyl and aryl groups.

Several references describe photoinitiators including "polyborate" anions, exemplified by EP 775706, U.S. Pat. No. 5,807,905 and WO 9852952. European patent EP 834492 describes polyiodonium cation-containing photoinitiators without mentioning application of these materials to coating optical fibers.

U.S. Pat. No. 4,655,545 discloses a glass fiber for fiber optic transmission networks. The reference discusses optical fibers extrusion coated with a fluorine containing resin. It is known that fluorine containing resin coatings cause reduction of the mechanical strength of optical fibers compared with similar optical fibers coated using resins that contain no fluorine. The reference attributes the lowering of mechanical strength to the generation of fluorine gas or hydrogen fluoride at the time of melt extrusion. According to the reference, these acidic gases pass through a first baked layer and reach the glass surface to weaken the glass fibers by erosion of the glass or interference with chemical bonding between the baked extruded coating and the glass surface. U.S. Pat. No. 5,181,269 presents a contrary finding by suggesting optical fiber strength improvement using acidic cationically photocured coatings containing hydrolyzable components e.g. hexafluoroarsenate and hexafluorophosphate anions. Although including materials and coating methods, this patent (U.S. Pat. No. 5,181,269) provides no supportive data related to optical fiber strength.

U.S. Pat. No. 5,554,664 describes energy activated salts with fluorocarbon anions. The reference discusses the advantage of catalysts with non-hydrolyzable anions for adhesives and related coatings used in electronics applications. Hydrolyzable anions exemplified by hexafluorophosphate ($PF_6^-$) and hexafluoroantimonate ($SbF_6^-$) ions react in the presence of moisture to produce corrosive hydrofluoric acid. The reference otherwise addresses onium salts containing methide and imide anions and gives examples of borate anion initiators.

The mechanical properties and lifetime of a coated optical fiber may be adversely affected by inappropriate selection of a photoinitiator to cure polymeric fiber coatings. The previous discussion of fluorinated photoinitiators describes formation of hydrofluoric acid in the presence of moisture. In the presence of corrosive materials, such as hydrofluoric acid, some GGP fibers exhibit a decrease in fiber strength, as shown in dynamic fatigue tests, when they are placed in a high temperature/high humidity environment. Unfortunately, high temperature and high humidity conditions are relatively common during operation of vehicles including submarines and related naval craft, space craft, aircraft, and other applications that currently use, or have the potential to use, optical fibers and related devices. In these cases, it is important to avoid corrosive materials.

In view of the desire to increase the volume of information transmitted via communication networks, using signal carriers having greater strength retention, there is a need for a small diameter, coated optical fiber that retains its strength following exposure to high temperature and high humidity. Small diameter coated optical fibers offer the possibility for producing fiber optic devices containing more signal carrier connections than current devices using fibers coated to a diameter of 250 microns.

SUMMARY OF THE INVENTION

The present invention satisfies the need for a small diameter, mechanically strong, coated optical fiber using a silica-clad, silica fiber coated with a permanent polymeric layer to a total diameter from about 120 microns to about 160 microns. A preferred embodiment of a coated optical fiber has a silica clad silica core drawn to a diameter of 80–85 microns before in-tower application of one or more permanent coatings that contribute to a finished optical fiber diameter of about 125 microns. The resulting coated optical fiber shows resistance to stress corrosion, and surprisingly exhibits high strength as measured by standard test method FOTP-28 (dynamic fatigue). Cleavable optical fibers, processed according to the present invention, readily interface with a number of standard fiber optic connectors, without stripping, to provide connections wherein the optical fiber has a high tolerance to bending stresses. This provides a useful benefit by decreasing the time needed to join an optical fiber to a suitable connector. The lack of a stripping step also enhances optical fiber reliability, because there is no need to expose the bare glass of the fiber to make a connection. Additional reliability for coated optical fibers according to the present invention accrues from polymerizing the permanent polymeric coating of a GGP fiber using a photoinitiator that does not produce potentially corrosive byproducts. In the absence of corrosive byproducts a coated optical fiber retains its strength for use in applications that include exposure to humid conditions at elevated temperature.

More particularly the present invention provides a coated optical fiber, preferably a GGP optical fiber comprising an optical fiber core, and a silica cladding over the optical fiber core, to provide a silica clad core. A permanent polymeric coating is applied to the silica cladding during exposure to actinic radiation of a photocurable composition containing a non-hydrolyzable photoinitiator. The coated optical fiber has a diameter from about 120 microns to about 150 microns and a relative frequency distribution of at least about 85% for dynamic fatigue measurements between about $49.2 \times 10^3$ $kg/cm^2$ (700 kpsi) and about $63.3 \times 10^3$ $kg/cm^2$ (900 kpsi).

Coated optical fibers according to the present invention are non-embedded or are otherwise unsupported by materials such as primary and secondary buffers, related coatings, encapsulants and the like.

Definitions

Use of the terms "stripping" or "buffer stripping" or "coating stripping" or the like refers to the removal of coatings from a coated optical fiber. Stripping may be performed mechanically, using a tool resembling a wire stripper, or chemically using aggressive liquid compositions, such as concentrated sulfuric acid, to dissolve a protective coating.

The term "optical fiber core" means the central cylinder of the fiber. Signals travel down the fiber, mostly constrained in the core due to total internal reflection.

The terms "buffer" or "buffer coating" refer to one or more outer coatings applied to an optical fiber during the manufacturing process, after drawing the optical fiber from a molten pre-form. Typically, formation of an optical fiber connection requires removal of a buffer prior to inserting an optical fiber end into a connector.

As used herein the term "cladding" refers to a layer of material, typically silica, around an optical fiber core. Preferably the cladding has a lower refractive index than the core to substantially confine light signals to the core.

Terms such as "polymer coat" or "P-coat" or "protective coating" or the like refer to a coating that adheres strongly to silica, e.g. optical fiber cladding, and is not easily removed. The coating represents a barrier to water vapor, dust, and other agents that attack the glass optical fiber, either mechanically or chemically. Also, a polymer coat forms strong bonds with adhesives used to affix optical fibers to optical fiber connectors. Description of a polymer coating as a "permanent polymer coating" relates to the fact that optical fiber connections may be made without removing the P-coat. Polymer coating materials preferably comprise cationically cured, non-ester containing epoxies and polyols preferably using a diaryl iodonium methide initiator. Suitable compositions may include mono- and poly-functional epoxies and polyols as diluents.

The term "GGP fiber" refers to an optical fiber structure, which viewed in cross section includes a doped silica (Glass) core, silica (Glass) cladding and at least one permanent, protective polymeric coating (P-coat). GGP fibers according to the present invention preferably have a cross sectional diameter of from about 120 microns to about 160 microns, most preferably 125 microns, while retaining tensile strength comparable with GGP optical fiber structures close to twice their diameter.

The terms "non-embedded" or "unsupported" and other substantially synonymous terms refer herein to coated optical fibers that do not require further protection by materials such as primary or secondary coatings, buffers, potting resins or related encapsulant type compositions. A ribbon cable represents one form of a fiber optic connecting structure that contains optical fibers surrounded typically by a polymeric encapsulant that adds support and prevents damage to the encapsulated fibers.

"Dynamic Fatigue" refers to a technique that is essentially a tensile to failure test that measures stress required to break an optical fiber. Dynamic fatigue measurement according to the present invention uses a modified EIA/TIA-455-28B standard test method including a strain rate of 9% per minute and a gauge length of four meters under ambient conditions. This test is otherwise referred to as Fiber Optic Test Procedure (FOTP) 28 entitled "Method for measuring Dynamic Tensile Strength of Optical Fibers," (i.e. EIA/TIA-455-28B—EIA=Electronic Industries Association and TIA=Telecommunications Industry Association).

Use of the terms "consistent performance" or "consistent strength" or the like refers to the behavior of optical fibers according to the present invention when subjected to dynamic fatigue testing. Consistent performance requires that the relative frequency distribution of test results shows that >85% of multiple test samples, for a given optical fiber, reach their failure point, under tensile stress, within a narrow range of values. Preferably, for dynamic fatigue testing, a coated optical fiber meets a requirement of $49.2 \times 10^3$ kg/cm² (700 kpsi) or greater within a range of $3.5 \times 10^3$ kg/cm² (50 kpsi) to $7.0 \times 10^3$ kg/cm² (100 kpsi). A relative frequency distribution of >90% is preferred. Dynamic fatigue values of >95% represent the highest level of consistent performance.

The term "coated optical fiber diameter" or related terms refer to the maximum diametric separation of the outer surface of the outermost coating around an optical fiber. The diameter may vary slightly depending upon precision of application of a coating for thickness control and concentricity relative to the optical fiber core.

As used herein the term "diaryliodonium methides" refers to photoinitiators belonging to a class of materials generally known as onium salts. A preferred diaryliodonium methide is bis(dodecylphenyl)iodonium tris(trifluoromethylsulfonyl) methide.

BRIEF DESCRIPTION OF THE DRAWINGS

Notwithstanding any other forms, which may fall within the scope or the present invention, preferred forms of the invention will now be described with reference to the accompanying drawing. The FIGURE is not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention, in which:

DETAILED DESCRIPTION OF THE PREFERRED EMBODIMENTS

Figure 1:
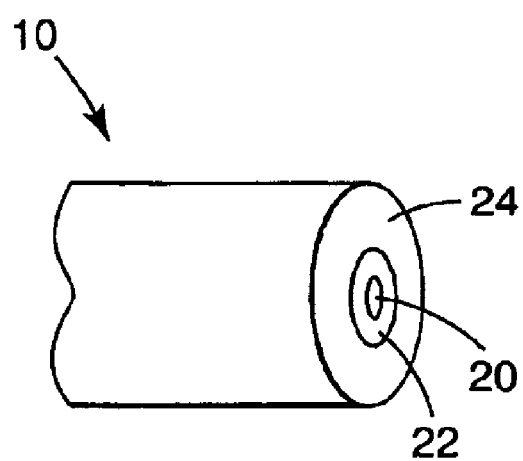
FIG. 1 is a schematic perspective view of an optical fiber according to the present invention.

Previous discussion shows that consideration was given to the formation of optical fibers including a core, cladding and polymeric coating to keep the diameter of the optical fiber structure to approximately 125 microns. The diameter was important for ease of insertion of optical fiber ends into matching 125 micron connectors such as crimp connectors. A durable polymer coating resisted penetration by a connecting structure to prevent damage, by scratching, cracking or the like, of the cladding. There was concern for protection against lateral pressure during application of a connector, but no consideration was given to general strength characteristics of the optical fiber.

Referring to FIG. 1, the present invention provides a coated optical fiber 10 preferably a GGP optical fiber comprising an optical fiber core 20 and a silica cladding 22 over the optical fiber core. A permanent polymeric coating 24 is applied to the silica cladding 22 during exposure to actinic radiation of a photocurable composition containing a non-hydrolyzable photoinitiator. The coated glass fiber, as a fine filament, has an outer diameter less than 160 microns and preferably less than about 130 microns, while maintaining strength characteristics comparable to coated optical fibers twice its diameter. Under the force of bending stress, a coated optical fiber according to the present invention survives a 6 mm (0.25 inch) radius bend. Other beneficial properties include resistance to abrasion, and insertion and attachment without stripping, for retention in optical fiber connectors. Although there are no outer buffer coats to strip, secure attachment of a fiber to a connector usually requires an adhesive.

A typical commercial GGP fiber construction has a silica core and a reduced silica cladding forming a structure of 100 microns diameter. A permanent polymeric coating or P-coat, 12.5 microns thick, and two standard buffer coats, each about 31.0 microns thick, give the GGP fiber a final diameter of approximately 250 microns. The first buffer coat provides microbend protection and the second buffer coat provides abrasion resistance. Suitable coating compositions include acrylated urethane polymers that are commercially available from DSM Desotech, Elgin, Ill.

Coated optical fiber structures, according to the present invention, show varying strength characteristics related to cross sectional structures of optical fibers preferably having a total outer diameter of less than about 160 microns. A distinguishing feature of the present invention is the production of optical fibers having consistent strength characteristics even though lacking the protection of primary and secondary coatings, or buffers. Primary and secondary coatings, as taught e.g. by U.S. Pat. No. 5,644,670 and EP0953857 A1, are common in the art and apparently considered indispensable. Consistent strength performance was not immediately apparent but required careful statistical analysis of dynamic fatigue measurements, involving numerous test samples. The analysis revealed a preference for a coated, silica clad fiber, using a photocurable coating that was polymerized using a cationic photoinitiator, preferably a diaryl iodonium salt. Comparison of statistical results further showed that coated optical fibers according to the present invention differed in strength characteristics depending on the anion of the diaryl iodonium salt. Optical fibers coated with a coating composition containing a non-hydrolyzable, diaryl iodonium methide photoinitiator generally showed more consistent strength performance than similar optical fibers that used a coating composition containing a hydrolyzable anion such as a hexafluoroantimonate anion (see Table 3 and Table 4). In contrast to known optical fibers that include primary or secondary buffers, or related coatings, optical fibers according to the present invention may be considered as "non-embedded" or "unsupported," having a diameter from about 120 microns to about 160 microns while maintaining consistent strength at least equal to known optical fibers protected with coatings to diameters of 250 microns or greater. Comparative Examples C1A–C1E (Table 1) provide coated GGP optical fibers including a silica clad optical fiber core having a single permanent polymeric coating (P-coat) applied to its surface. The silica clad optical fiber core has a diameter of 100 microns, and the coating has a thickness of 12.5 microns to produce a coated optical fiber having an outer diameter of 125 microns. In Comparative Examples C1A–C1D the coating comprised 5 wt % of bis(dodecylphenyl) iodonium hexafluoroantimonate ($SbF_6^-$) photoinitiator solution and 95 wt % of an epoxy functional, photocurable resin. The curable resin contained 90 wt % of EPON 828 (a bisphenol diglycidyl ether resin available commercially from Shell Chemical Co., Houston, Tex.) and 10 wt % of TONE 0301 (a caprolactone triol based polymer with hydroxyl functionality available from Union Carbide, Danbury Conn.). The photoinitiator solution contained 38.5 wt % (40 parts) of an iodonium hexafluoroantimonate, 57.7 wt % (60 parts) decyl alcohol and 3.8 wt % (4 parts) of isopropylthioxanthone. Measurement of these coated fibers, using dynamic fatigue testing (FOTP-28) indicated a maximum strength of about $52.7 \times 10^3$ kg/cm$^2$ (750 kpsi) with sufficient fibers failing at about $14.1 \times 10^3$ kg/cm$^2$ (200 kpsi) to indicate that coated fibers of this type have inconsistent strength characteristics.

Example C1E was produced using a P-coat comprising 5 wt % of bis(dodecylphenyl) iodonium methide photoinitiator solution and 95 wt % of an epoxy functional, photocurable resin. The photocurable resin in this case contained 60 wt % of EPON 828 (Shell Chemical Co., Houston, Tex.) and 40 wt % of GP 554 (Genesee Polymers Inc., Flint Mich.). The photoinitiator solution contained 38.5 wt % (40 parts) of bis(dodecylphenyl) iodonium methide, 57.7 wt % (60 parts) decyl alcohol and 3.8 wt % (4 parts) of isopropylthioxanthone. Measurement of coated fibers of Example C1E, using dynamic fatigue testing (FOTP-28) indicated a maximum strength of about $52.7 \times 10^3$ kg/cm$^2$ (750 kpsi). Sufficient fibers failed at about $16.2 \times 10^3$ kg/cm$^2$ (230 kpsi) to indicate inconsistent strength characteristics. In comparison with Examples C1A–C1D a slight improvement was observed at the lower end of the range of values.

Application of a urethane-acrylate buffer layer 17.5 microns thick over a P-coat of similar thickness to Examples C1A–C1E increases the strength of a coated fiber, raising the lower limit of dynamic fatigue to about $28.1 \times 10^3$ kg/cm$^2$ (400 kpsi). The outer diameter of the coated optical fiber also reaches 160 microns (Example 1A–1C), which lies towards the upper limit of preferred GGP coated optical fibers according to the present invention.

The coated 160 micron optical fibers, of Examples 1A and 1B, included a P-coat polymer that was photocured using bis(dodecylphenyl) iodonium hexafluoroantimonate photoinitiator. The photocurable resin contained 75 wt % of EPON 828 (a bisphenol diglycidyl ether resin available commercially from Shell Chemical Co., Houston, Tex.) and 25 wt % of GP 554 (a silicone with a high level of epoxy functionality, available commercially from Genesee Polymers Inc., Flint Mich.). The photoinitiator solution contained 38.5 wt % (40 parts) of an iodonium hexafluoroantimonate, 57.7 wt % (60 parts) decyl alcohol and 3.8 wt % (4 parts) of isopropylthioxanthone.

Replacement of the hexafluoroantimonate photoinitiator in Examples 1A and 1B with dodecylphenyl iodonium methide photoinitiator (Example 1C) provided noticeable improvement in the consistency of dynamic fatigue measurements. This improvement, due to selection of bis (dodecylphenyl) iodonium methide photoinitiator, allowed development of a coated optical fiber having a diameter of approximately 130 microns (see Examples 2A–2D). In this case, a coated fiber includes a silica clad optical fiber of 80 microns coated with a P-coat approximately 12.5 microns thick and a urethane-acrylate buffer also approximately 12.5 microns thick. Compared to the thicker 160 microns coated optical fibers, the coated optical fibers of Examples 2A–2D consistently withstood a higher maximum stress of about $56.2 \times 10^3$ kg/cm$^2$ (800 kpsi) with an occasional failure no lower than $42.2 \times 10^3$ kg/cm$^2$ (600 kpsi). This is surprising considering that the 160 micron fiber includes a 100 micron silica clad fiber and a thicker buffer layer than the coated optical fibers having a diameter of approximately 130 microns.

Progress was made towards a desired coated optical fiber by continuing to use a dual coated construction but lowering the outer diameter to 125 microns. A suitable coated optical fiber includes an 80 micron diameter silica clad optical fiber coated with a P-coat 11 microns thick that is then overcoated with a 11.5 microns layer of a commercial urethane-acrylate to give the dual coated fiber an outer diameter of 125 microns. The resulting coated optical fiber (see Example 3) consistently survived dynamic fatigue testing to $51.3 \times 10^3$ kg/cm$^2$ (730 kpsi) with infrequent failure at $45.7 \times 10^3$ kg/cm$^2$ (650 kpsi). The range of dynamic fatigue, from about $45.7 \times 10^3$ kg/cm$^2$ (650 kpsi) to about $51.3 \times 10^3$ kg/cm$^2$ (730 kpsi) is narrower than for coated optical fiber structures discussed above, even though the upper limit (i.e. $51.3 \times 10^3$ kg/cm$^2$ (730 kpsi)) was exceeded previously.

A preferred coated optical fiber having an outer diameter of 125 microns comprises a silica clad fiber having a diameter of 80 micron coated only with a permanent polymer coating or P-coat. The thickness of the P-coat is about 22.5 microns to provide a coated optical fiber having an outer diameter of 125 microns. Polymer coating compositions for a preferred single coated fiber include commercially available acrylated urethane compositions cured using a free radical photoinitiator (Example 4). Suitable protective coatings are available from DSM Desotech, Elgin, Ill., particularly a composition identified as DSM 3471-2-136 that includes the photoinitiator. As an alternative, a cationically photocurable P-coat may be used containing epoxy functional monomers crosslinkable with e.g. diaryl iodonium methide photoinitiators (Example 5). Results for dynamic fatigue testing suggest improved strength characteristics for 125 micron optical fibers coated with a cured epoxide resin compared with the same thickness of a urethane acrylate resin. Regardless of the relative results both coated optical fibers exceed a generally satisfactory dynamic fatigue value of about $49.2 \times 10^3$ kg/cm$^2$ (700 kpsi).

Preferred optical fibers according to the present invention include GGP fibers having an outer diameter from about 120 microns to about 160 microns. These coated optical fibers overcome problems of strength degradation to consistently maintain dynamic fatigue performance comparable with GGP fibers including two buffers that raise the coated fiber diameter to 250 microns. The use of a P-coat formulation comprising a preferred non-hydrolyzable photoinitiator, such as a diaryl iodonium methide, eliminates the problems of hydrolysis even in the presence of fluorine-containing moieties.

Examples of non-hydrolyzable photoinitiators include diaryl iodonium salts including anions selected from $C(SO_2CF_3)_3^-$, $B(C_6F_5)_4^-$, and $N(SO_2CF_3)_2^-$. Even though containing fluoride ions, a preferred class of anions in cationic photoinitiators according to the present invention include fluorinated tris alkyl- or arylsulfonyl methides and corresponding bis alkyl- or arylsulfonyl imides. Formulas I and II below, provide general formulae to represent "methide" and "imide" anions respectively.

$(R_fSO_2)_3C^-$ (Formula I)

$(R_fSO_2)_2N^-$ (Formula II)

Each $R_f$ is independently selected from the group consisting of highly fluorinated or perfluorinated alkyl or fluorinated aryl radicals. The methides and imides may also be cyclic, by linking together any two $R_f$ groups to form a bridge. Typically, the $R_f$ alkyl chains contain from 1–20 carbon atoms, with 1–12 carbon atoms preferred. The $R_f$ alkyl chains may be branched or cyclic, but are preferably straight. Heteroatoms or radicals, such as divalent oxygen, trivalent nitrogen or hexavalent sulfur, may interrupt the skeletal chain. When $R_f$ is or contains a cyclic structure, such structure preferably has 5 or 6 ring members, including 1 or 2 heteroatoms. The alkyl radical R is also free of ethylenic or other carbon-carbon unsaturation, e.g. it is a saturated aliphatic, cycloaliphatic or heterocyclic radical. By "highly fluorinated" is meant that the degree of fluorination on the chain is sufficient to provide the chain with properties similar to those of a perfluorinated chain. More particularly, a highly fluorinated alkyl group will have more than half the total number of hydrogen atoms on the chain replaced with fluorine atoms. Although hydrogen atoms may remain on the chain, it is preferred that all hydrogen atoms be replaced with fluorine to form a perfluoroalkyl group. Bromine or chlorine atoms may replace any hydrogen atoms not replaced with fluorine. It is more preferred that at least two out of three hydrogens on the alkyl group be replaced with fluorine, still more preferred that at least three of four hydrogen atoms be replaced with fluorine and most preferred that all hydrogen atoms be replaced with fluorine to form a perfluorinated alkyl group.

The fluorinated aryl radicals of Formulas I and II may contain from 6 to 22 ring carbon atoms, preferably 6 ring carbon atoms, where at least one, and preferably at least two, ring carbon atoms of each aryl radical is substituted with a fluorine atom or a highly fluorinated or perfluorinated alkyl radical as defined above, e.g., $CF_3$.

Specific examples of anions useful in the practice of the present invention include: $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, and the like. More preferred anions are those described by Formula I, wherein R is a perfiuoroalkyl radical having 1–4 carbon atoms, particularly a tris (trifluoromethylsulfonyl) methide anion. Anions of this type, and methods for making them, are described in U.S. Pat. Nos. 4,505,997, 5,021,308, 4,387,222, 5,072,040, 5,162,177 and 5,273,840 and in Turowsky and Seppelt, Inorg. Chem., 27, 2135–2137 (1988). Turowsky and Seppelt describe the direct synthesis of the $(CF_3SO_2)_3C^-$ anion from $CF_3SO_2F$ and $CH_3MgCl$ in 20% yield based on $CF_3SO_2F$ or 19% yield based on $CH_3MgCl$. U.S. Pat. No. 5,554,664 describes an improved method for synthesizing iodonium methide.

Salts of the above described anions, generally known as onium salts, may include sulfonium and iodonium cations. These salts may be activated by actinic radiation or heat or may require two stage activation involving actinic radiation followed by heat. Suitable salts include those producing reactive species for polymerization of P-coat compositions, when exposed to sufficient energy having a wavelength from about 200 nm to about 800 nm. Initiation may occur during exposure to energy from various sources including heat, accelerated particle beam (electron beam), or electromagnetic radiation sources.

Experimental

The following section provides a description of general procedures for the manufacture of coated optical fibers according to the present invention.

Fiber Drawing Process

A Nokia-Maillefer fiber draw tower (Vantaa, Finland) was used as the optic draw tower for coated optical fibers according to the present invention. The fiber draw process, used a downfeed system to control the feeding rate of an optical pre-form into a 15 KW Lepel Zirconia induction furnace (Lepel Corp., Maspeth, N.Y.). Suitable pre-forms include those produced via modified chemical vapor deposition (MCVD). Heating the pre-form in the furnace raised its temperature to between 2200° C. and 2250° C., for drawing an optical fiber to the required dimensions. A laser telemetric measurement system (LaserMike™), located below the heat source, measured the drawn fiber diameter while monitoring the fiber position within the tower.

The newly formed fiber was passed to a primary coating station for application of a permanent protective coating. The coating station included a coating die assembly, a Fusion Systems R Corp. microwave UV curing system, a concentricity monitor, and another laser telemetric measurement system. The coating die assembly included sizing dies, and a back pressure die inside a containment housing, mounted on an adjustable stage having pitch and tilt control and x-y translation for coating concentricity. The protective coating material was supplied to the coating die assembly from a pressurized vessel for application to the optical fiber followed by curing of the coating and measurement of the coated fiber dimensions within the primary coating station. Preferably the UV source is a Fusion Systems UV lamp with H+ bulb that emits actinic radiation in a range of wavelengths from about 254 nm to about 365 nm. The duration of exposure to UV radiation depends upon the draw speed of the optical fiber and is typically less than about one second.

Where desired, a buffer was applied to the coated fiber at a secondary coating station, to provide a dual coated optical fiber having a second permanent coating. Dual coating of this type requires the use of an additional sizing die supplied with material from a separate pressurized vessel. The coatings were cured, as above and the coated fiber outer diameter was measured. The coated optical fiber was collected using a conventional form of cylindrical take-up.

Dynamic Fatigue Testing Procedure

The dynamic fatigue of coated optical fibers according to the present invention was determined using a modified EIA/TIA-455-28B, using a strain rate of 9% per minute and a gauge length of four meters under ambient conditions. An alternate description of the test method uses the phrase Fiber Optic Test Procedure ("FOTP") 28, entitled "Method for Measuring Dynamic Tensile Strength of Optical Fibers,"i.e. EIA/TIA-455-28B (This is a revision of EIA-455-28A. EIA stands for Electronic Industries Association and TIA stands for Telecommunications Industry Association).

Materials

Polymer coating A comprises 5 wt % of bis (dodecylphenyl) iodonium hexafluoroantimonate ($SbF_6^-$) photoinitiator solution and 95 wt % of a photocurable resin containing 90 wt % of EPON 828 (a bisphenol diglycidyl ether resin available commercially from Shell Chemical Co., Houston, Tex.) and 10 wt % of TONE 0301 (a caprolactone triol based polymer with hydroxyl functionality, available commercially from Union Carbide, Danbury Conn.). The photoinitiator solution contains 38.5 wt % (40 parts) of an iodonium hexafluoroantimonate, 57.7 wt % (60 parts) decyl alcohol and 3.8 wt % (4 parts) of isopropylthioxanthone.

Polymer coating B comprises 5 wt % of bis (dodecylphenyl) iodonium methide photoinitiator solution and 95 wt % of a resin containing 60 wt % of EPON 828 (a bisphenol diglycidyl ether resin available commercially from Shell Chemical Co., Houston, Tex.) and 40 wt % of GP 554 (a silicone with a high level of epoxy functionality, available commercially from Genesee Polymers Inc., Flint Mich.). The photoinitiator solution contains 38.5 wt % (40 parts) of bis(dodecylphenyl) iodonium methide, 57.7 wt % (60 parts) decyl alcohol and 3.8 wt % (4 parts) of isopropylthioxanthone.

Polymer coating C comprises 5 wt % of bis (dodecylphenyl) iodonium methide photoinitiator solution and 95 wt % of a resin containing 80 wt % of EPON 830 (a bisphenol diglycidyl ether resin available commercially from Shell Chemical Co., Houston, Tex.) and 20 wt % of TERATHANE 2000 (a polytetrahydrofuran diol available form Sigma-Aldrich, Milwaukee, Wis.). The photoinitiator solution contains 38.5 wt % (40 parts) of bis(dodecylphenyl) iodonium methide, 57.7 wt % (60 parts) decyl alcohol and 3.8 wt % (4 parts) of isopropylthioxanthone.

Polymer coating D comprises 5 wt % of bis (dodecylphenyl) iodonium methide photoinitiator solution and 95 wt % of a resin containing 40 wt % of EPON 830 (a bisphenol diglycidyl ether resin available commercially from Shell Chemical Co., Houston, Tex.) and 30 wt % of 2,2'-Oxybis(6-oxabicyclo[3.1.0]hexane) (available commercially from Sigma-Aldrich, Aldrich, Milwaukee Wis.) and 30 wt % of Terathane 2900 (a polytetrahydrofuran diol available from Sigma-Aldrich, Milwaukee, Wis.). The photoinitiator solution contains 38.5 wt % (40 parts) of bis (dodecylphenyl) iodonium methide, 57.7 wt % (60 parts) decyl alcohol and 3.8 wt % (4 parts) of isopropylthioxanthone.

Polymer coating E comprises 5 wt % of bis (dodecylphenyl) iodonium hexafluoroantimonate ($SbF_6$) photoinitiator solution and 95 wt % of a resin containing 75 wt % of EPON 828 (a bisphenol diglycidyl ether resin available commercially from Shell Chemical Co., Houston, Tex.) and 25 wt % of GP 554 (a silicone with a high level of epoxy functionality, available commercially from Genesee Polymers Inc., Flint Mich.). The photoinitiator solution contains 38.5 wt % (40 parts) of bis(dodecylphenyl) iodonium hexafluoroantimonate ($SbF_6^-$), 57.7 wt % (60 parts) decyl alcohol and 3.8 wt % (4 parts) of isopropylthioxanthone.

Polymer coating F comprises 5 wt % of bis(dodecylphenyl) iodonium methide photoinitiator solution and 95 wt % of a resin containing 75 wt % of EPON 828 (a bisphenol diglycidyl ether resin available commercially from Shell Chemical Co., Houston, Tex.) and 25 wt % of GP 554 (a silicone with a high level of epoxy functionality, available commercially from Genesee Polymers Inc., Flint Mich.). The photoinitiator solution contains 38.5 wt % (40 parts) of bis(dodecylphenyl) iodonium methide, 57.7 wt % (60 parts) decyl alcohol and 3.8 wt % (4 parts) of isopropylthioxanthone.

Polymer coating G is an acrylated urethane coating identified as DSM 3471-2-136 (available from DSM Desotech, Elgin, Ill.)

Polymer coating H is an acrylated urethane coating identified as DSM 3471-2-137 (available from DSM Desotech, Elgin, Ill.)

EXAMPLES

Table 1 provides Comparative Examples of coated optical fiber prepared using a similar process to that used for optical fibers of Examples according to the present invention shown in Table 2. Both tables include information indicating diameters for silica clad optical fibers, thickness of coatings applied thereto, and the total diameters of coated optical fibers.

Comparative Examples C1A–C1E

Examples C1A–C1E represent coated optical fibers prepared using separate runs of material under substantially the same draw tower conditions. The polymer (P-coat) coating used for Examples C1A–C1D was an epoxy resin cured using a cationic photoinitiator having a hexafluoroantimonate anion. Example C1E used a cationic photoinitiator having a methide anion. Table 3 shows that the strength of optical fibers of Examples C1A–C1D was variable with only a small percentage of samples exceeding $49.2 \times 10^3$ kg/cm² (700 kpsi). The use of a different photoinitiator for Example C1E improves the percentage of fibers breaking above $49.2 \times 10^3$ kg/cm² (700 kpsi) without satisfying consistent strength requirements.

Comparative Example C2

Example C2 is a coated optical fiber prepared by draw tower application of two permanent coatings to a silica clad optical fiber. The polymer (P-coat) coating was an epoxy resin cured using a cationic photoinitiator having a methide anion. This was overcoated with an acrylated urethane coating identified as DSM 3471-2-136 (available from DSM Desotech, Elgin, Ill.) that cures by a radical polymerization mechanism. Dynamic fatigue (tensile to failure as in FOTP-28) of multiple samples of Examples C2 gave results spread over a range from about $49.2 \times 10^3$ kg/cm² (700 kpsi) to about $56.2 \times 10^3$ kg/cm² (800 kpsi) (Table 3). The structure of coated optical fibers of Example C2 was similar to that of Example 3 of the invention. Although exhibiting some higher values than Example 3, dynamic fatigue testing of Example C2, showed more variability than Example 3. The results suggest change in performance due to the changes in coating materials used in this comparative example versus the invention Example 3.

Comparative Example C3

Example C3 is a coated optical fiber prepared by draw tower application of a permanent coating to a silica clad optical fiber. The polymer (P-coat) coating was an epoxy/polyol resin combination, cured using a cationic photoinitiator having a methide anion. Dynamic fatigue (tensile to failure as in FOTP-28) of multiple samples of Examples C3 gave results spread over a range from about $45.7 \times 10^3$ kg/cm² (650 kpsi) to $52.7 \times 10^3$ kg/cm² (750 kpsi), the majority of which were below $49.2 \times 10^3$ kg/cm² (700 kpsi) (Table 3).

Examples 1A–1C

Examples 1A–1C represent coated optical fibers, having a diameter of about 160 microns, prepared using separate runs of material under substantially the same draw tower conditions. The polymer (P-coat) coating used for Example 1A and Example 1B was an epoxy resin cured using a cationic photoinitiator having a hexafluoroantimonate anion. An iodonium methide photoinitiator was used to cure the polymer coating of Example 1C. In each case the P-coat was overcoated with an acrylated urethane coating identified as DSM 3471-2-136 (available from DSM Desotech, Elgin, Ill.) that cures by a radical polymerization mechanism. Dynamic fatigue (tensile to failure as in FOTP-28) of Examples 1A and 1B gave results showing reasonable consistency from about $49.2 \times 10^3$ kg/cm² (700 kpsi) to about $52.7 \times 10^3$ kg/cm² (750 kpsi). Example 1C gave consistent, improved performance close to $56.2 \times 10^3$ kg/cm² (800 kpsi). Example 1C differs from the others only in the use of bis(dodecylphenyl) iodonium methide photoinitiator for curing the P-coat.

Examples 2A–2D

Examples 2A–2D represent coated optical fibers, having a diameter of about 130 microns, prepared using separate runs of material under substantially the same draw tower conditions. The polymer (P-coat) coating was an epoxy resin cured using a cationic photoinitiator having a methide anion. This was overcoated with an acrylated urethane coating that cures by a radical polymerization mechanism. Dynamic fatigue (tensile to failure as in FOTP-28) of multiple samples of Examples 2A–2D showed highest consistency and strength with results close to $56.2 \times 10^3$ kg/cm² (800 kpsi).

Example 3

Example 3 is a coated optical fiber, having a diameter of about 125 microns, prepared by draw tower application of coatings to a graded index multimode silica clad optical fiber. The polymer (P-coat) coating was an epoxy resin cured using a cationic photoinitiator having a methide anion. This was overcoated with an acrylated urethane coating identified as DSM 3471-2-136 (available from DSM Desotech, Elgin, Ill.) that cures by a radical polymerization mechanism. Dynamic fatigue (tensile to failure as in FOTP-28) of multiple samples of Examples 3 gave results concentrated around $49.2 \times 10^3$ kg/cm$^2$ (700 kpsi).

Example 4 and Example 5

Examples 4 and 5 represent coated optical fibers, having a diameter of about 125 microns, prepared by draw tower application of a single permanent coating to a graded index multimode silica clad optical fiber. An acrylated urethane coating, identified as DSM 3471-2-137 (available from DSM Desotech, Elgin, Ill.), that cures by a radical polymerization mechanism, was used as the polymer (P-coat) coating for Example 4. The polymer (P-coat) coating of Example 5 was an epoxy resin cured using an onium photoinitiator having a methide anion. Dynamic fatigue (tensile to failure as in FOTP-28) of multiple samples of Examples 4 gave results concentrated around $51.3 \times 10^3$ kg/cm$^2$ (730 kpsi). Testing of Example 5 revealed a stronger coated optical fiber construction having dynamic fatigue values concentrated around $56.2 \times 10^3$ kg/cm$^2$ (800 kpsi).

TABLE 1

OPTICAL FIBER CONSTRUCTION AND DYNAMIC FATIGUE FOR COMPARATIVE EXAMPLES C1A–E, C2 AND C3

| Example | Glass diameter microns | P-coat (type) microns | Buffer (type) microns | Overall diameter microns |
|---|---|---|---|---|
| C1A | 100 | 12.5 (A) | — | 125 |
| C1B | 100 | 12.5 (A) | — | 125 |
| C1C | 100 | 12.5 (A) | — | 125 |
| C1D | 100 | 12.5 (A) | — | 125 |
| C1E | 100 | 12.5 (B) | — | 125 |
| C2  | 80  | 11.0 (C) | 11.5 (G) | 125 |
| C3  | 90  | 15.5 (D) | — | 121 |

TABLE 2

OPTICAL FIBER CONSTRUCTION AND DYNAMIC FATIGUE FOR EXAMPLES 1A–C, 2A–D, 3, 4, AND 5

| Example | Glass diameter microns | P-coat (type) microns | Buffer (type) microns | Overall diameter microns |
|---|---|---|---|---|
| 1A | 100 | 12.5 (E) | 17.5 (G) | 160 |
| 1B | 100 | 12.5 (E) | 17.5 (G) | 160 |
| 1C | 100 | 12.5 (F) | 17.5 (G) | 160 |
| 2A | 80  | 12.5 (B) | 12.5 (G) | 130 |
| 2B | 80  | 12.5 (B) | 12.5 (G) | 130 |
| 2C | 80  | 12.5 (B) | 12.5 (G) | 130 |
| 2D | 80  | 12.5 (B) | 11.5 (H) | 128 |
| 3  | 80  | 11 (B)   | 11.5 (G) | 125 |
| 4  | 80  | —        | 22.5 (H) | 125 |
| 5  | 80  | 22.5 (B) | —        | 125 |

Table 3 includes the results of dynamic fatigue testing of the coated optical fibers of Examples C1A–C1E, Example C2 and Example C3. Table 4 provides the results for Examples 1A–1C, Examples 2A–2D and Examples 3–5. The information provides the relative frequency distribution for a number of duplicate samples between ten and twenty-five depending on the coated optical fiber under test. Fiber performance at a given level of dynamic fatigue is given as the percent of fiber samples passing at that level.

It is noticeable that Examples C1A–C1D show relatively poor performance, with less than 50% of the sample fibers passing dynamic fatigue above $49.2 \times 10^3$ kg/cm$^2$ (700 kpsi), which is considered a threshold value. While not wishing to be bound by theory, it is believed that the use of a hydrolyzable photoinitiator, iodonium hexafluoroantimonate, in the P-coat composition, introduces corrosive fluoride species that attack and weaken the glass of the coated optical fiber. This appears possible by comparison with Example C1E that uses a non-hydrolyzable bis(dodecylphenyl) iodonium methide photoinitiator to yield a relative frequency distribution of 72% of samples tested showing better than $49.2 \times 10^3$ kg/cm$^2$ (700 kpsi). Coated fiber strength improvement is evident from comparison of Examples 1A and 1B with Example 1C, where only the latter bears a P-coat cured using a photoinitiator containing a non-hydrolyzable methide anion.

Coated optical fibers of Examples 2A–2C, Example 3, Example 4 and Example 5, include narrow diameter silica clad optical fibers of 80 microns diameter, versus the fibers of the earlier examples, having diameters up to 100 microns. Considering the expectation that a smaller diameter fiber may also be more fragile, it is remarkable that coated optical fibers, including an 80 micron silica clad fiber optic core, consistently show good retention of mechanical strength characteristics as measured by dynamic fatigue. Dynamic fatigue test results (Table 4) for coated optical fibers (GGP) having diameters less than about 160 microns demonstrate the consistent strength of coated fibers according to the present invention. The use of a bis(dodecylphenyl) iodonium methide as the preferred photoinitiator for curing P-coat compositions produces narrow diameter coated optical fibers (preferably <130 microns) having strength characteristics at least comparable to earlier GGP coated fibers having approximately twice the diameter.

TABLE 3

RELATIVE FREQUENCY DISTRIBUTION OF DYNAMIC FATIGUE
MEASUREMENTS FOR COMPARATIVE EXAMPLES C1A–E, C2 AND C3

| | Dynamic Fatigue Measurement (kg/cm$^2$) | | | | | |
|---|---|---|---|---|---|---|
| Example | $38.7 \times 10^3$ to $42.2 \times 10^3$ | $42.2 \times 10^3$ to $45.7 \times 10^3$ | $45.7 \times 10^3$ to $49.2 \times 10^3$ | $49.2 \times 10^3$ to $52.7 \times 10^3$ | $52.7 \times 10^3$ to $56.2 \times 10^3$ | More than $56.2 \times 10^3$ |
| C1A | — | — | — | 18.2% | — | — |
| C1B | — | 9.1% | — | 27.3% | 9.1% | — |
| C1C | 20% | 10% | — | 20% | 10% | — |
| C1D | — | 5% | — | 40% | — | — |
| C1E | — | — | 4% | 72% | — | — |
| C2 | 4% | — | — | 40% | 56% | — |
| C3 | 4% | 4% | 56% | 36% | — | — |

TABLE 4

RELATIVE FREQUENCY DISTRIBUTION OF DYNAMIC FATIGUE
MEASUREMENTS FOR EXAMPLES 1A–C, 2A–D, 3, 4 AND 5

| | Dynamic Fatigue Measurement (kg/cm$^2$) | | | | | |
|---|---|---|---|---|---|---|
| Example | $38.7 \times 10^3$ to $42.2 \times 10^3$ | $42.2 \times 10^3$ to $45.7 \times 10^3$ | $45.7 \times 10^3$ to $49.2 \times 10^3$ | $49.2 \times 10^3$ to $52.7 \times 10^3$ | $52.7 \times 10^3$ to $56.2 \times 10^3$ | More than $56.2 \times 10^3$ |
| 1A | 5% | — | 5% | 90% | — | — |
| 1B | — | — | 5% | 90% | — | — |
| 1C | — | — | — | 5% | 95% | — |
| 2A | — | — | — | — | — | 100% |
| 2B | — | 5% | — | — | 95% | — |
| 2C | — | — | — | — | 100% | — |
| 2D | — | — | — | — | 100% | — |
| 3 | — | 4% | — | 96% | — | — |
| 4 | — | — | — | 96% | — | — |
| 5 | 4% | — | — | — | 92% | — |

Coated GGP optical fibers retain desirable strength characteristics and at the same time withstand stresses associated with bend radii of about 6 mm (0.25 inch). Optical fibers according to the present invention meet the requirements for applications requiring short lengths of fiber substantially unaffected by microbending. Such applications include the use of thinner optical fibers and smaller interconnects for optical switches, fiber-on-board connections, optical backplane connections and optical cross connects.

An unsupported, small diameter, consistent strength, GGP optical fiber and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A coated optical fiber comprising:
   a silica cladding; and
   a coating applied to said cladding to provide said coated optical fiber having a diameter from about 120 microns to about 150 microns, said coated optical fiber further having a relative frequency distribution of at least about 85% for dynamic fatigue measurements between about $49.2 \times 10^3$ kg/cm$^2$ and about $63.3 \times 10^3$ kg/cm$^2$.

2. The coated optical fiber of claim 1 wherein said relative frequency distribution is at least about 90%.

3. The coated optical fiber of claim 1, wherein said diameter is from about 128 microns to about 135 microns and said relative frequency distribution is at least about 95%.

4. The coated optical fiber of claim 1, wherein said coated optical fiber further includes an optical fiber core covered by said silica cladding.

5. The coated optical fiber of claim 4, wherein said optical fiber core and said silica cladding provide a silica clad core having a diameter from about 65 microns to about 100 microns.

6. The coated optical fiber of claim 5, wherein said silica clad core has a diameter from about 80 microns to about 90 microns.

7. The coated optical fiber of claim 5, wherein said coating is a polymeric coating.

8. The coated optical fiber of claim 7, wherein said polymeric coating comprises a first layer in contact with a second layer.

9. The coated optical fiber of claim 7, wherein said polymeric coating forms by curing of a coating composition that contains a cationic photoinitiator.

10. The coated optical fiber of claim 9, wherein said cationic photoinitiator is a diaryl iodonium salt having a diaryliodonium cation and an anion selected from the group consisting of hexafluoroantimonates, and methide anions having a general formula $(R_fSO_2)_3C^-$.

11. The coated optical fiber of claim 10, wherein said general formula $(R_fSO_2)_3C^-$ is selected from the group consisting of $(CF_3SO_2)_3C^-$, $(C_4F_9SO_2)_3C^-$, and $(C_8F_{17}SO_2)_3 C^-$, and the like.

12. A GGP optical fiber comprising:
an optical fiber core;
a silica cladding over said optical fiber core, to provide a silica clad core; and
a permanent polymeric coating applied to said cladding by exposure to actinic radiation of a photocurable composition containing a photoinitiator, said GGP optical fiber having a diameter from about 120 microns to about 150 microns, said GGP optical fiber further having a relative frequency distribution of at least about 85% for dynamic fatigue measurements between about $49.2 \times 10^3$ kg/cm$^2$ and about $63.3 \times 10^3$ kg/cm$^2$.

13. The GGP optical fiber of claim 12, wherein said relative frequency distribution is at least about 90%.

14. The GGP optical fiber of claim 13, wherein said diameter is from about 128 microns to about 135 microns and said relative frequency distribution is at least about 95%.

15. The GGP optical fiber of claim 12, wherein said silica clad core has a diameter from about 65 microns to about 100 microns.

16. The GGP optical fiber of claim 15, wherein said silica clad core has a diameter from about 80 microns to about 90 microns.

17. The GGP optical fiber of claim 12, wherein said permanent polymeric coating has a thickness from about 10 microns to about 25 microns.

18. The GGP optical fiber of claim 17, wherein said permanent polymeric coating has a thickness from about 20 microns to about 23 microns.

19. The GGP optical fiber of claim 12, wherein said photoinitiator comprises a diaryl iodonium salt having a diaryliodonium cation and an anion selected from the group consisting of hexafluoroantimonates, and methide anions having a general formula $(R_fSO_2)_3C^-$.

20. The GGP optical fiber of claim 19, wherein said general formula $(R_fSO_2)_3C^-$ is selected from the group consisting of $(CF_3SO_2)_3C^-$, $(C_4F_9SO_2)_3C^-$, and $(C_8F_{17}SO_2)_3 C^-$, and the like.

21. A single small diameter coated optical fiber comprising:
a silica cladding; and
a coating applied to said cladding to provide said small diameter coated optical fiber having a diameter from about 120 microns to about 150 microns, said small diameter coated optical fiber further having a relative frequency distribution of at least about 85% to show consistency of mechanical strength measured as dynamic fatigue in a range between about $49.2 \times 10^3$ kg/cm$^2$ and about $63.3 \times 10^3$ kg/cm$^2$.

* * * * *

UNITED STATES PATENT AND TRADEMARK OFFICE
CERTIFICATE OF CORRECTION

PATENT NO. : 6,895,156 B2
DATED : May 17, 2005
INVENTOR(S) : Walker, Christopher B. Jr.

It is certified that error appears in the above-identified patent and that said Letters Patent is hereby corrected as shown below:

Column 10,
Line 59, delete "perfiuoroalkyl" and insert in place thereof -- perfluoroalkyl --.

Signed and Sealed this

Twenty-third Day of August, 2005

JON W. DUDAS
*Director of the United States Patent and Trademark Office*